US012578753B2

(12) United States Patent
Hsieh et al.

(10) Patent No.: US 12,578,753 B2
(45) Date of Patent: Mar. 17, 2026

(54) CLOCK ALIGNING CIRCUIT AND METHODS FOR OPERATING THE SAME

(71) Applicant: Taiwan Semiconductor Manufacturing Company, Ltd., Hsinchu (TW)

(72) Inventors: Cheng-Hsiang Hsieh, New Taipei City (TW); Min-Shueh Yuan, Hsinchu City (TW); Mu-Shan Lin, Hsinchu City (TW); You-Cheng Lu, Hsinchu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 260 days.

(21) Appl. No.: 18/322,734

(22) Filed: May 24, 2023

(65) Prior Publication Data

US 2024/0255984 A1      Aug. 1, 2024

Related U.S. Application Data

(60) Provisional application No. 63/441,444, filed on Jan. 27, 2023.

(51) Int. Cl.
G06F 1/12          (2006.01)
G06F 1/10          (2006.01)

(52) U.S. Cl.
CPC .  G06F 1/12 (2013.01); G06F 1/10 (2013.01)

(58) Field of Classification Search
CPC ..................................... G06F 1/08; G06F 1/10
See application file for complete search history.

(56) References Cited

U.S. PATENT DOCUMENTS

| | | | | |
|---|---|---|---|---|
| 5,416,861 A | * | 5/1995 | Koh ........................ | G06F 1/105 |
| | | | | 398/154 |
| 5,696,951 A | * | 12/1997 | Miller .............. | G01R 31/31922 |
| | | | | 327/161 |
| 10,509,104 B1 | * | 12/2019 | Dato ........................ | G01S 13/87 |
| 2003/0188299 A1 | * | 10/2003 | Broughton .............. | G06F 8/445 |
| | | | | 717/141 |

(Continued)

FOREIGN PATENT DOCUMENTS

| | | |
|---|---|---|
| JP | 2010-171092 A | 8/2010 |
| JP | 2021-179798 A | 11/2021 |

(Continued)

OTHER PUBLICATIONS

Office Action issued in connection with Korean Appl. No. 10-2023-0160298 dated Jan. 8, 2025.

(Continued)

*Primary Examiner* — Phil K Nguyen
(74) *Attorney, Agent, or Firm* — Foley & Lardner LLP

(57)          ABSTRACT

A semiconductor package includes a plurality of semiconductor chips. The semiconductor package includes a redistribution structure. The redistribution structure can be configured to electrically couple the plurality of semiconductor chips to each other, and further configured to transmit a single global clock signal. Data transferred across the plurality of semiconductor chips can be synchronized in a clock domain to which the single global clock signal belongs.

20 Claims, 10 Drawing Sheets

(56)                    References Cited

U.S. PATENT DOCUMENTS

| | | | | |
|---|---|---|---|---|
| 2010/0097107 A1* | 4/2010 | Dartu | .................. | G06F 30/3312 |
| | | | | 716/113 |
| 2016/0105273 A1* | 4/2016 | Choi | ...................... | H03M 9/00 |
| | | | | 375/376 |
| 2017/0248989 A1* | 8/2017 | Vrudhula | .................. | G06F 1/12 |
| 2018/0198596 A1* | 7/2018 | Restle | ...................... | G06F 1/12 |
| 2021/0376833 A1* | 12/2021 | Jennings | ............ | H03K 19/1774 |
| 2021/0382520 A1* | 12/2021 | Margalit | ............... | H04J 3/0685 |
| 2021/0383201 A1* | 12/2021 | Gu | .......................... | G06N 3/063 |
| 2022/0200604 A1 | 6/2022 | Fredenburg et al. | | |
| 2024/0201729 A1* | 6/2024 | Henry | ...................... | G06F 1/12 |

FOREIGN PATENT DOCUMENTS

| | | |
|---|---|---|
| KR | 10-2007-0006788 A | 1/2007 |
| KR | 10-2017-0048523 A | 5/2017 |
| TW | 201935621 A | 9/2019 |
| TW | 202205809 A | 2/2022 |
| TW | 202230186 A | 8/2022 |

OTHER PUBLICATIONS

Office Action issued in connection with Taiwan Appl. No. 112127129 dated Aug. 12, 2024.

\* cited by examiner

300

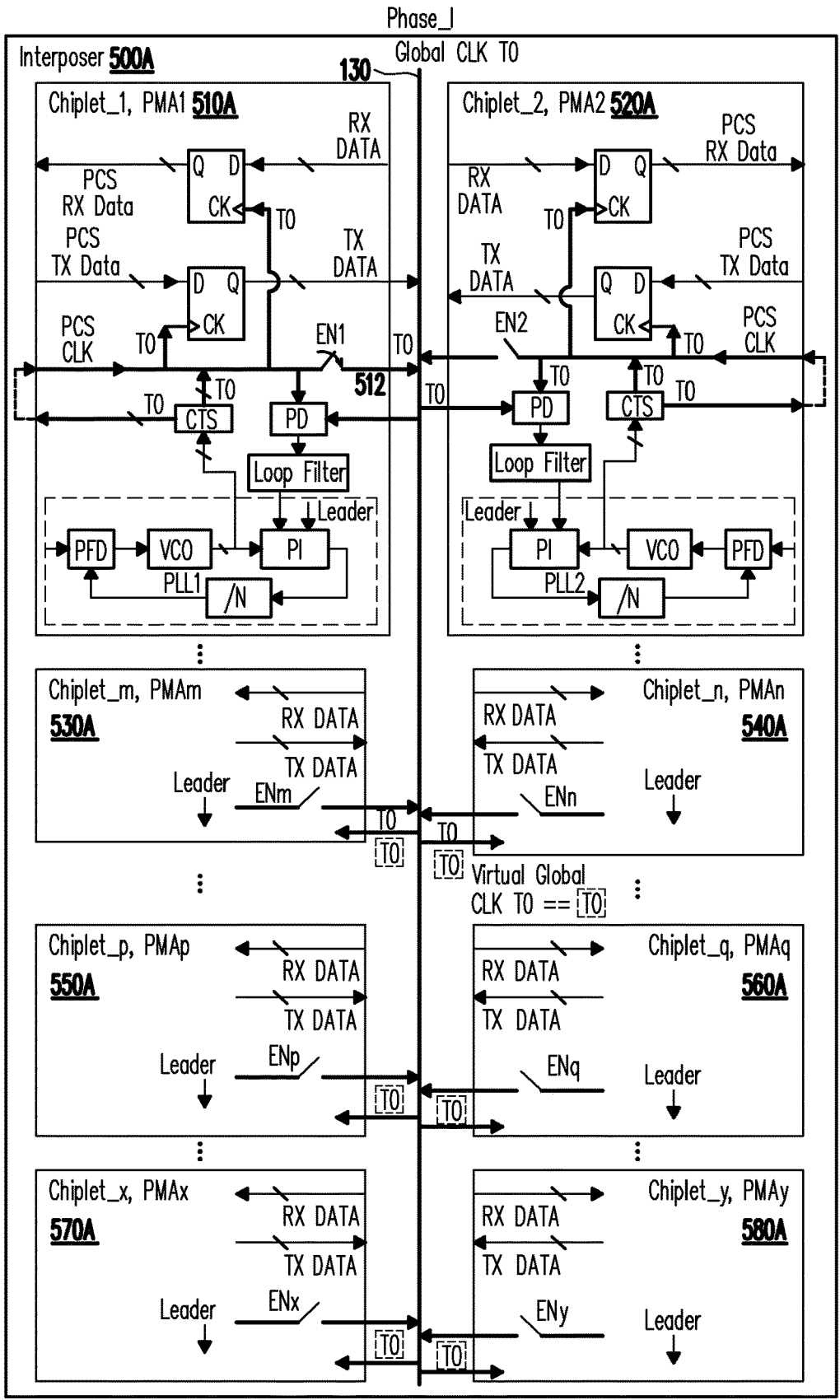
FIG. 5A     500

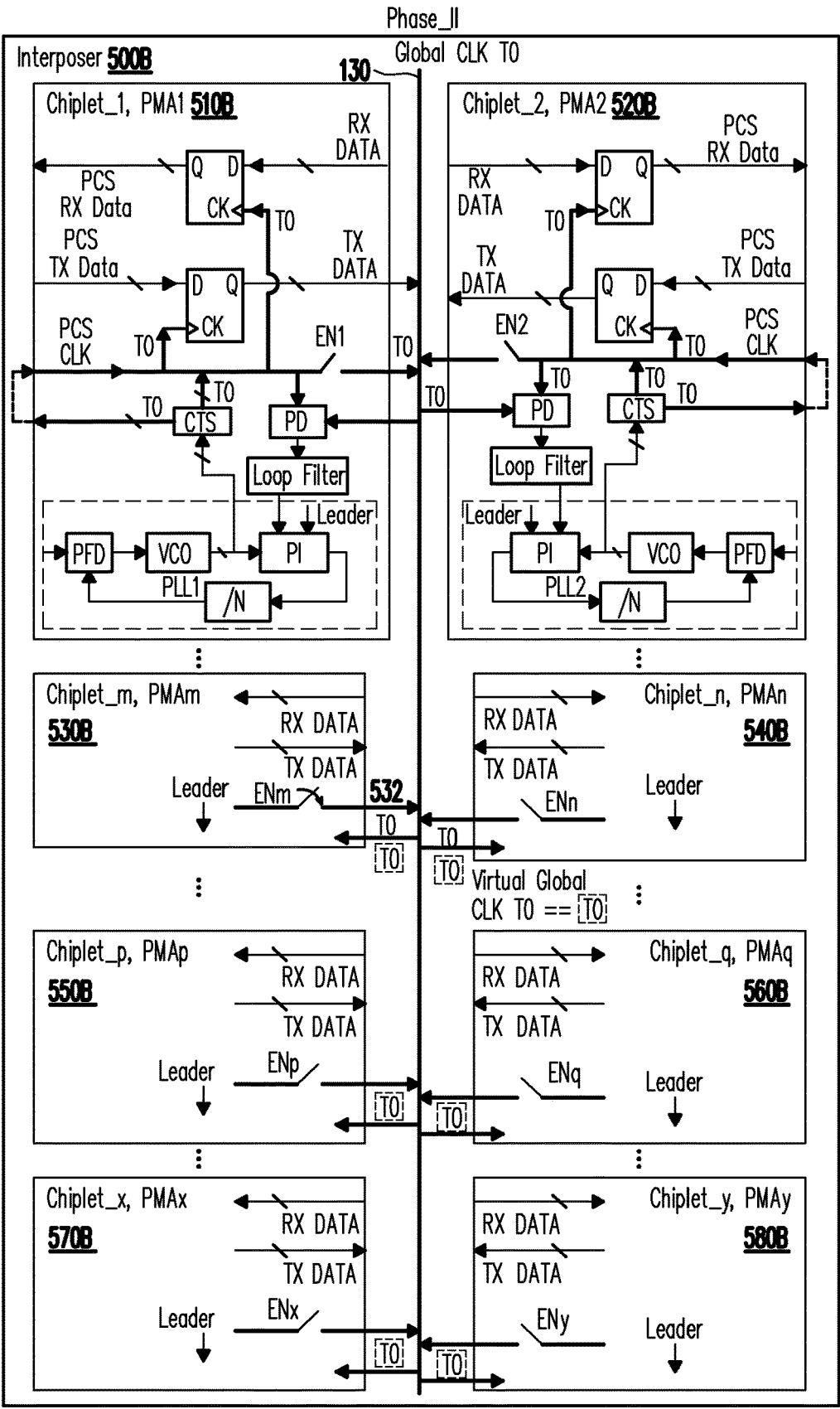
FIG. 5B                    500

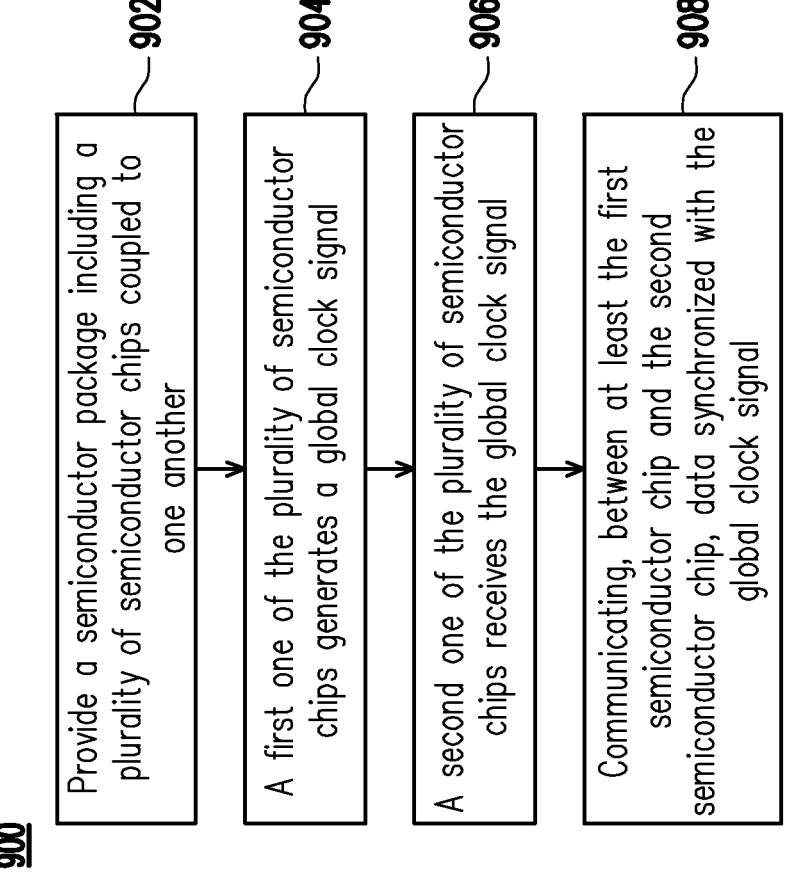

900

902 — Provide a semiconductor package including a plurality of semiconductor chips coupled to one another 904 — A first one of the plurality of semiconductor chips generates a global clock signal 906 — A second one of the plurality of semiconductor chips receives the global clock signal 908 — Communicating, between at least the first semiconductor chip and the second semiconductor chip, data synchronized with the global clock signal

FIG. 9

CLOCK ALIGNING CIRCUIT AND METHODS FOR OPERATING THE SAME

CROSS-REFERENCE TO RELATED APPLICATION

This application claims priority to and the benefit of U.S. Provisional Application No. 63/441,444, filed Jan. 27, 2023, entitled "METHOD OF CLOCK ALIGNING IN CHIPLETS," which is incorporated herein by reference in its entirety for all purposes.

BACKGROUND

There are two types of 3D/2.5D integrated circuit (IC) die-to-die interface. One type has fast speed per link with a complex circuit. For example, Universal Chiplet Interconnect Express (UCIe) interface is in this type with up to 32 Gb/s data rate. The other type has slower speed per link but with a simple circuit. The advantage of small circuit area can be that total bandwidth and power efficiency increase with smaller bump pitches. A simple-circuit interface can have higher bandwidth than the UCIe interface with only half the power.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 5A and 5B collectively illustrate a schematic diagram of an example clock aligning circuit, in accordance with some embodiments.

FIG. 9 is an example flow chart of a method for clock aligning in chiplets, in accordance with some embodiments.

DETAILED DESCRIPTION

Figure 1:
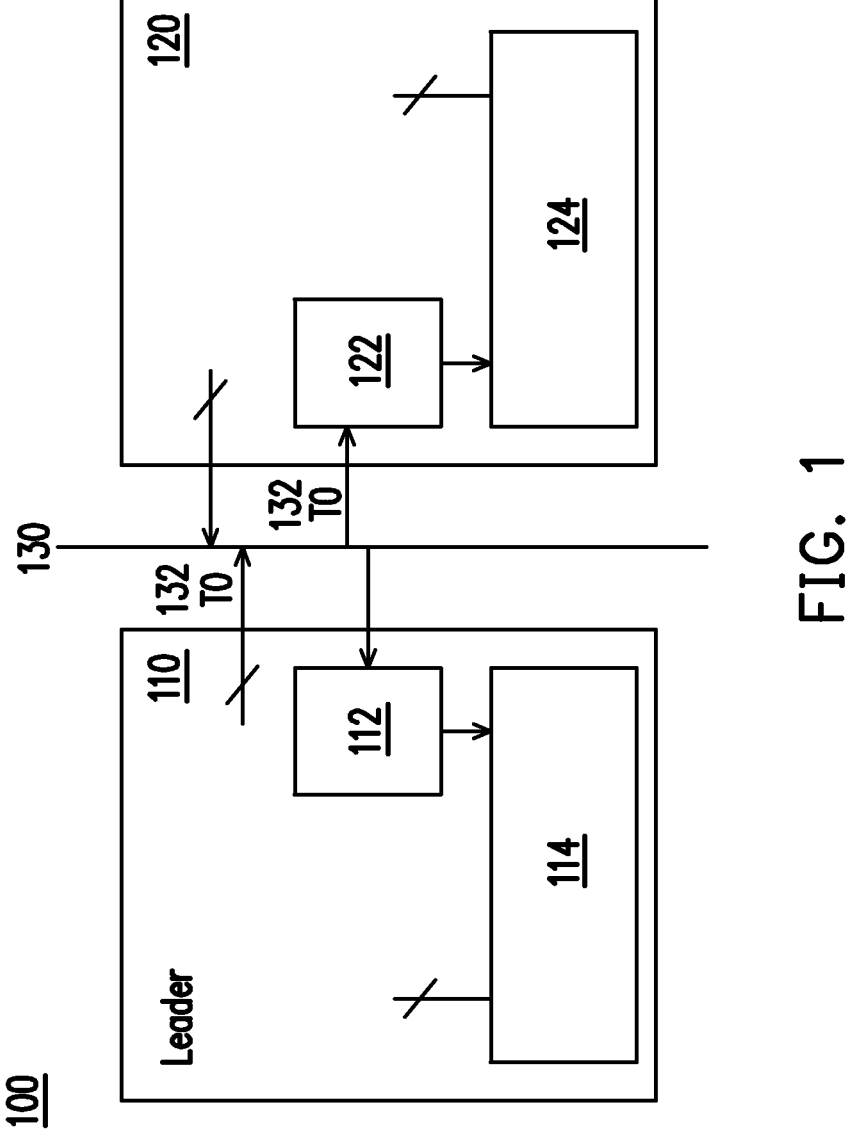
FIG. 1 is a schematic diagram of an example clock aligning circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As semiconductor technologies further advance, packaged semiconductor devices, e.g., three dimensional integrated circuits (3D ICs), have emerged as an effective alternative to further reduce the physical size of semiconductor devices. In a packaged (e.g., stacked) semiconductor device, active circuits such as logic, memory, processor circuits, and the like are fabricated on different semiconductor wafers or dies. Two or more these semiconductor dies may be installed side-by-side or stacked on top of one another to further reduce the form factor of the semiconductor device.

In an integrated circuit (IC) (e.g., 2.5D/3D IC) die-to-die interface, a clock (CLK) may not be synchronized between die-to-die interface while data transferring. Each chiplet may deliver both transmitting data (TX DATA) and transmitting clock (TX CLK) independently. The TX CLK can be generated locally (e.g., each TX physical medium attachment (PMA)), and the TX CLK may be unsynchronized with other chips' clock domains. Each chiplet may synchronize a receiving clock (RX CLK) (from the TX CLK of other chiplet) with its local clock domain at a RX PMA. The chiplet may include a delay lock loop (DLL) to shift RX CLK phase for 90 degree, and a first in first out (FIFO) to accommodate phase and frequency difference between the TX CLK and a RX local phase lock loop (PLL) CLK. In order to align/synchronize the clock, a complex circuit may need to be designed, which may not be cost effective for slower speed per link applications. The present disclosure can synchronize clocking between chiplets in a single global CLK for data transferring with a cost effective simple-circuit for smaller pitch integrations.

FIG. 1 is a schematic diagram of an example clock aligning/synchronizing circuit 100, in accordance with some embodiments. The clock aligning circuit 100 can be used for any type of die-to-die (e.g., 2.5D/3D IC). The clock aligning circuit 100 may include a first semiconductor chip 110, a second semiconductor chip 120, a redistribution structure 130, a first phase align element (PAE) 112, a second phase align element 122, a first phase locked loop (PLL) 114, and a second phase locked loop (PLL) 124. In some embodiments, the first semiconductor chip 110 and/or the second semiconductor chip 120 can be a chipset or a system-on-chip (SoC). The first semiconductor chip 110 and/or the second semiconductor chip 120 may include logic dies and/or memory dies. Example logic dies may include Central Processing Units (CPUs), Application processors (APs), system on chips (SOCs), Application Specific Integrated Circuits (ASICs), or other types of logic dies including logic transistors therein. Example memory dies include Dynamic Random Access Memory (DRAM) dies, Static Random Access Memory (SRAM) dies, High-Bandwidth Memory (HBM) dies, Micro-Electro-Mechanical System (MEMS) dies, Hybrid Memory Cube (HMC) dies, or the like. In some embodiments, the first semiconductor chip 110 and/or the second semiconductor chip 120 may be in charge of communication (e.g., receiving data and/or transmitting data) among a central processing unit (CPU), a graphic processor unit (GPU), a random access memory (RAM), a storage, and/or other peripherals. In certain embodiments, the first semiconductor chip 110 can be a "leader" chiplet and the second semiconductor chip 120 can be a "follower" chiplet. The "leader" chiplet may generate a global clock, and may transmit the global clock to the "follower" chiplet via the redistribution structure 130.

The redistribution structure 130 can be configured to electrically couple a plurality of semiconductor chips to each other. The redistribution structure 130 can be further configured to transmit a single global clock signal 132 (e.g., TO). The single global clock can be driven from the "leader" chiplet with phase of TO. The redistribution structure 130 can be formed over an interposer (e.g., a CoWoS interposer). The redistribution structure 130 may comprise electrically conductive features such as one or more layers of conductive lines and vias formed in one or more dielectric layers. For simplicity, the electrically conductive features and the dielectric layers of the redistribution structure 130 are not illustrated individually in FIG. 1 (which will be discussed in further detail in FIG. 2). In a CoWoS package, a variety of chips comprising active circuits are first attached to an interposer wafer using micro bumps (ubumps) to form a chip-on-wafer (CoW) structure. The variety of chips may be interconnected using through silicon vias (TSVs) in the interposer wafer. The CoW structure may then be attached to a substrate to form the completed CoWoS package.

The first phase align element (PAE) 112 and/or the second phase align element 122 may include at least a phase aligned phase detector (PD) and/or a loop filter. The first phase align element 112 and/or the second phase align element 122 may identify a phase difference between a global clock (CLK) (e.g., TO) and a local phase locked loop CLK. For example, a PAE of a non-leader chiplet can identify a phase difference between a global clock (CLK) (e.g., TO) and a clock tree synthesis (CTS) (e.g., a local PLL CLK). The PAE of the non-leader chiplet can be a small area in the chiplet, which can minimize a design change for local PLL to have a phase tuning feature.

In some embodiments, the phase aligned phase detector may be configured to receive a reference frequency (e.g., a global CLK, TO) and a divider frequency (e.g., an internal clock, or a local phase locked loop clock). The phase aligned phase detector may output an error signal (e.g., a phase difference signal). In some embodiments, the phase aligned phase detector may comprise a time-to-digital converter (TDC). The TDC may convert pulses into a digital representation of the time indices of the pulses. The TDC may not account for a magnitude of the pulses. In some embodiments, the phase aligned phase detector may comprise a time-to-current converter (TCC) and an analog-to-digital converter (ADC). The TCC may convert pulses into an analog current signal of the time indices of the pulses. The ADC may convert the analog current signal to a digital signal. The combination of the TCC and ADC can be capable of accounting for a magnitude of the pulses of the reference frequency, to help reduce erroneous pulse detection resulting from signal noise. In some embodiments, the phase aligned phase detector may compare a rising edge of the reference frequency with a rising edge of the divider frequency. In instances where the rising edge of the reference frequency occurs before the rising edge of the divider frequency, the reference frequency can be said to be leading the divider frequency. The phase difference signal can be a positive value when the reference frequency is leading the divider frequency. In instances where the rising edge of the divider frequency occurs before the rising edge of the reference frequency, the divider frequency can be said to be leading the reference frequency. The phase difference signal can be a negative value when the divider frequency is leading the reference frequency.

In some embodiments, the loop filter can be electrically coupled to the phase aligned phase detector to receive the error signal (e.g., phase difference signal) and output a fine tuning signal (e.g., phase adjust signal, recovered data). The loop filter may fix/adjust the phase difference when a number of cycles having phase difference exceeds a threshold. The threshold may be configured in the loop filter. If the number of cycles having phase difference is lower than the threshold, the error signal may be filtered. In some embodiments, the loop filter may comprise a low pass filter. In some embodiments, the loop filter may comprise a high pass filter. In some embodiments, the loop filter may comprise a gain amplifier. The loop filter can be configured to have a smaller lock range. The lock range can be a frequency range over which the PLL can lock the output frequency to the reference frequency (e.g., the global CLK). By reducing the lock range of the loop filter, locking time and stability of phase locked loop (PLL) can be increased. Once the output frequency is synchronized with the reference frequency, the loop filter can be used to compensate for subsequent fluctuations within the reference frequency or the output frequency. In some embodiments, the loop filter can be utilized to parallel process input data.

The first phase locked loop 114 and/or the second phase locked loop 124 may at least include a phase interpolator (PI), a multi-phase voltage control oscillator (VCO), and a phase frequency detector (PFD). A phase locked loop (PLL) can be an electrical circuit usable to generate a synthesized oscillating signal according to a reference signal. PLLs can be used to synchronize signals. In certain embodiments, PLLs can be used in radio transceivers, telecommunications, clock multipliers, microprocessors and other devices which use synchronized signals. PLLs can be used to synchronize the signals of two separate devices.

In some embodiments, the phase interpolator may align/adjust the phase of the internal clock (e.g., local phase locked loop clock) with the global clock based on a first control signal (e.g., the error signal, the fine tuning signal) in a manner that limits a phase shift differential between the internal clock and the global clock. The phase interpolator may provide an N-bit output signal. In some embodiments, the first control signal can be a single-bit control signal which is provided to the phase interpolator and which is updated at regular time intervals to reflect a present phase relationship between the local phase locked loop clock and the global clock. Thus, over a number of consecutive time intervals, the single-bit control signal can establish a multi-bit pattern that represents the phase relationship between the local phase locked loop clock and the global clock over time. The phase interpolator may evaluate the multi-bit pattern and may provide an N-bit control signal to the phase frequency detector.

In some embodiments, the phase frequency detector can be configured to generate a set of second control signals, such as control signals PFD_UP and PFD_DN, based on a phase difference between the internal clock (e.g., local phase locked loop clock) and the global clock.

In some embodiments, the multi-phase voltage control oscillator (VCO) can be configured to generate an oscillating signal responsive to the set of second control signals. The multi-phase voltage control oscillator (VCO) may lock an oscillating signal to a reference pulse signal (e.g., the global clock signal).

Figure 2:
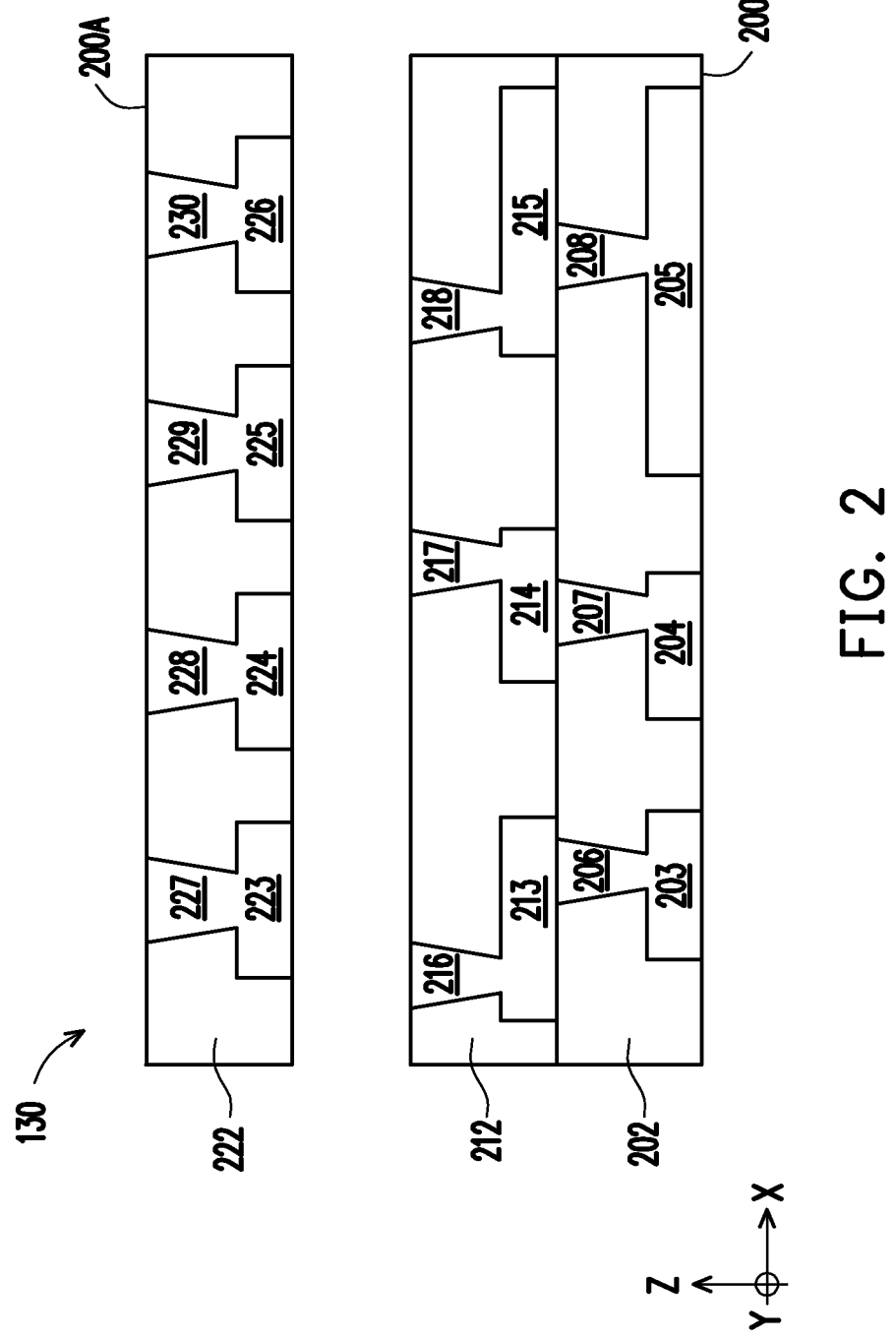
FIG. 2 illustrates a schematic diagram of an example redistribution structure 130 in FIG. 1, in accordance with various embodiments.

FIG. 2 illustrates a schematic diagram of an example redistribution structure 130 in FIG. 1, in accordance with various embodiments. For example, FIG. 2 illustrates a cross-sectional view (e.g., a cross-section cut along a plane expanded on the X direction and Z direction) of a portion of the example redistribution structure 130. It should be appreciated that the redistribution structure 130 of FIG. 2 is simplified for illustration purposes. Accordingly, the redistribution structure 130 can include any of various other components or features, while remaining within the scope of the present disclosure. In some embodiments, the redistribution structure 130 can be configured to transmit a single global clock signal.

To form such a packaged semiconductor device including a number of semiconductor dies, a redistribution structure electrically coupled to those semiconductor dies is typically used. In general, the redistribution structure of a packaged semiconductor device can be configured to allow connectors (e.g., input/output pads) of a semiconductor die (e.g., the first semiconductor chip 110) available in other locations of the packaged semiconductor device, e.g., for better access to the connectors where necessary, and other semiconductor dies (e.g., the second semiconductor chip 120). Such a redistribution structure typically includes a number of redistribution layers stacked on top of one another. Each of the redistribution layers, embedded in a dielectric material, includes a number of conductive structures electrically coupled to neighboring redistribution layer(s). One or more of the conductive structures are configured to provide supply voltage to one or more corresponding semiconductor die(s), which are sometimes referred to as a power/ground plane, and some of the conductive structures are configured to carry signals to and/or from the corresponding semiconductor die(s), which are sometimes referred to as signal routing paths.

As shown in FIG. 2, the redistribution structure 130 includes a number of redistribution layers 202, 212 . . . 222. Although three layers are shown, it should be understood that the redistribution structure 130 can include any number of redistribution layers, while remaining within the scope of the present disclosure. In various embodiments, the redistribution structure 130 can provide a conductive pattern that allows a pin-out contact pattern for a packaged semiconductor device (sometimes referred to as a package) different than a pattern of connectors on one or more semiconductor dies. Stated another way, the redistribution structure 130 can redistribute or otherwise rearrange a first pattern of a number of first connectors as a second pattern of a number of second connectors. Each of the redistribution layers 202 to 222 may include a number of conductive structures (e.g., conductive lines, vias) embedded in a dielectric material, where the conductive structures across the different redistribution layers 202 to 222 can collectively form such a conductive pattern.

For example in FIG. 2, the redistribution layer 202 may include conductive lines 203, 204, and 205, and vias 206, 207, and 208. The redistribution layer 212 may include conductive lines 213, 214, and 215, and vias 216, 217, and 218. The redistribution layer 222 may include conductive lines 223, 224, 225, and 226, and vias 227, 228, 229, and 230. As will be discussed in further detail below, each of the conductive lines and vias, as disclosed herein, essentially consists of a metal material, and is embedded or otherwise surrounded by a dielectric material. Stated another way, each of the redistribution layers 202 to 222 may embed a number of conductive lines and a number of vias within a dielectric material.

The conductive line of one of the redistribution layers 202 to 222 can be (e.g., electrically) coupled to the conductive line of any of the other upper or lower redistribution layers 202 to 222 through at least one via, according to various embodiments. As a representative example, the via 206 electrically couples an overlying (or upper) conductive line 213 to an underlying (or lower) conductive line 203. In addition, the conductive lines may each extend along any direction(s), e.g., formed as a line having a lengthwise direction extending along a certain lateral direction, a pattern having plural portions each of which extends along a respective different lateral direction, or a plane extending along two lateral directions, according to a particular design. As such, these conductive lines and vias can collectively form a conductive pattern.

Further, such a conductive pattern, constituted by the conductive lines and vias, can convert a first connector pattern formed on a first side 200A of the redistribution structure 130 to a second connector pattern formed on a second side 200B of the redistribution structure 130. For example, a number of first connectors (not shown in FIG. 2) coupled to the vias 227 to 230, respectively, can form a first connector pattern. The first connector pattern can be configured to operatively (e.g., electrically) coupled to a number of semiconductor dies/chips (which will be discussed in further detail below). The first connector pattern, through the conductive pattern constituted by at least some of the conductive lines and vias, can be converted to a second connector pattern formed by a number of second connectors (not shown in FIG. 2). These second connectors are coupled to the conductive lines 203 to 205, respectively. The second connector pattern can be configured to operatively (e.g., electrically) coupled to a substrate. Such first/second connectors can each include a solder ball, a metal pillar, a controlled collapse chip connection (C4) bump, a micro bump, an electroless nickel-electroless palladium-immersion gold technique (ENEPIG) formed bump, a through silicon/substrate via, a combination thereof (e.g., a metal pillar having a solder ball attached thereof), or the like. As a result, the redistribution structure 130 allows a number of semiconductor dies/chips (each of which may have a certain function, e.g., a global clock, a logic die, a memory die, etc.) to be integrated on a single substrate thereby forming a packaged semiconductor device.

Figure 3:
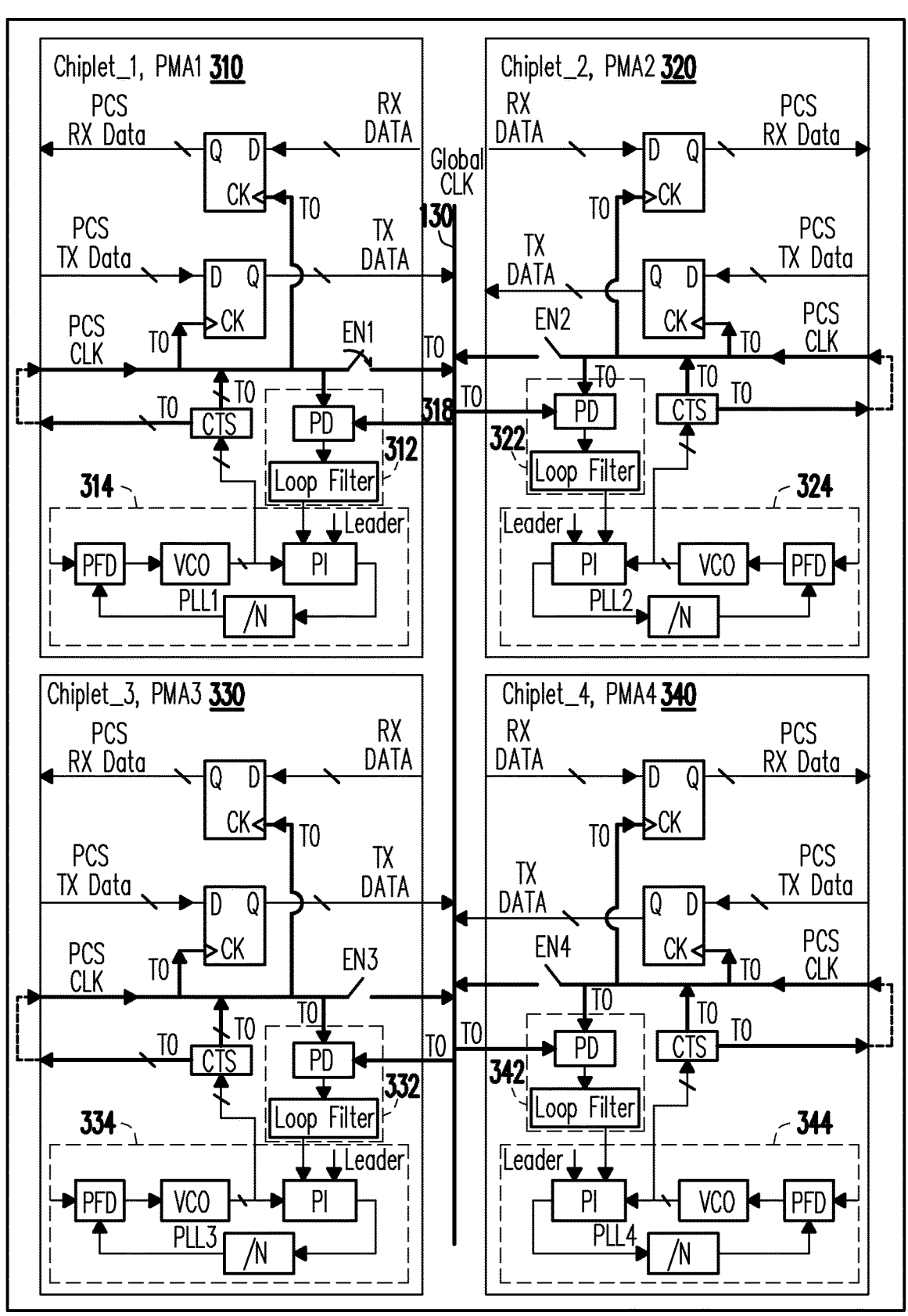
FIG. 3 is a schematic diagram of an example clock aligning circuit, in accordance with some embodiments.

FIG. 3 is a schematic diagram of an example clock aligning/synchronizing circuit 300, in accordance with some embodiments. The clock aligning circuit 300 can be used for any type of die-to-die (e.g., 2.5D/3D IC). The clock aligning circuit 300 may include a first semiconductor chip 310, a second semiconductor chip 320, a third semiconductor chip 330, a fourth semiconductor chip 340, a redistribution structure 130, a first phase align element 312, a second phase align element 322, a third phase align element 332, a fourth phase align element 342, a first phase locked loop (PLL) 314, a second phase locked loop (PLL) 324, a third phase locked loop (PLL) 334, and a fourth phase locked loop (PLL) 344. Common features with those of FIG. 1 will not be described again for the sake of conciseness. The first semiconductor chip 310 can be a "leader" chiplet and other semiconductor chips (e.g., the second semiconductor chip 320, the third semiconductor chip 330, and the fourth semiconductor chip 340) can be "follower" chiplets. In some embodiments, the "leader" chiplet can be any of the follower chiplets. The "leader" chiplet may generate a global clock, and may transmit the global clock to the "follower" chiplets via the redistribution structure 130.

The redistribution structure 130 can be configured to electrically couple the plurality of semiconductor chips to each other. The redistribution structure 130 can be further configured to transmit a single global clock signal 132 (e.g., T0). The global clock can be driven from the "leader" chiplet with phase of T0. In certain embodiments, the global clock can be driven by a bypass phase interpolator (PI) in a phase locked loop (PLL) of the "leader" chiplet. The other chiplets (e.g., followers) may select an proper PI output in the phase locked loop to make a clock tree synthesis (CTS) align the phase T0 in a physical medium attachment (PMA) and a physical coding sublayer (PCS). The PMA may transmit/receive symbol stream to/from the PCS. The PMA may couple data from the PCS, and may provide clock recovery, data management. All data transferring between chiplets can be synchronized in one global clock domain of T0 (e.g., may function as a SoC single chip). A clock aligning circuit may simply re-design by adding a phase interpolator (PI) in a phase locked loop (PLL), and a phase aligned phase detector (PD) with a loop filter in a physical medium attachment (PMA). With the clock aligning circuit, a RX first in first out (RX FIFO) and delay lock loops (DLLs) for 90 degree phase shift and de-skew with a PCS clock in a PMA of each chiplet may not be needed because the PMA and the PCS are in the same clock domain with a global clock. The global clock provides a simple clock network in a plurality of semiconductor chips.

In some embodiments, a signal line 318 can be disabled when the first semiconductor chip 310 is the "leader" chiplet. In certain embodiments, only one clock signal can be transmitted in the redistribution structure 130.

In some embodiments, the global clock T0 can be generated from the first semiconductor chip 310 (e.g., chiplet 1) and can be transmitted back to itself via the signal line 318. Since the global clock T0 and the internal clock of the first semiconductor chip 310 (e.g., the leader chiplet) substantively have no phase difference, the phase aligned phase detector (PD) may not detect any phase difference.

Figure 4:
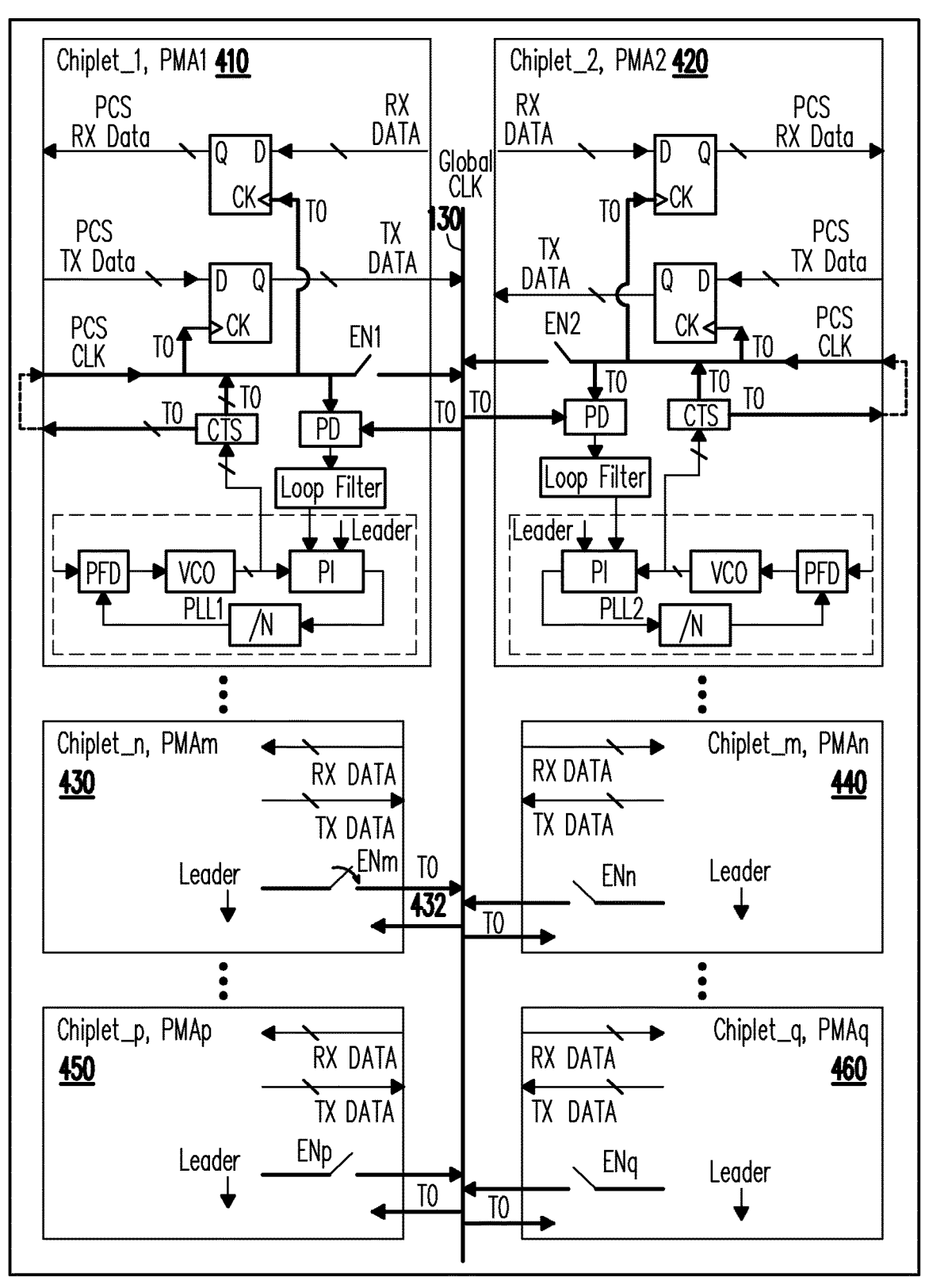
FIG. 4 is a schematic diagram of an example clock aligning circuit, in accordance with some embodiments.

FIG. 4 is a schematic diagram of an example clock aligning/synchronizing circuit 400, in accordance with some embodiments. The clock aligning circuit 400 can be used for any type of die-to-die (e.g., 2.5D/3D IC). The clock aligning circuit 400 may include a first semiconductor chip 410, a second semiconductor chip 420, a n-th semiconductor chip 430, a m-th semiconductor chip 440, a p-th semiconductor chip 450, a q-th semiconductor chip 460, and a redistribution structure 130. Common features with those of FIG. 1 will not be described again for the sake of conciseness. If there are many chiplets, a leader chiplet can be chosen/selected to minimize a TO transmission distance/time. For example, the n-th semiconductor chip 430 can be a "leader" chiplet and other semiconductor chips (e.g., the first semiconductor chip 410, the second semiconductor chip 420, the m-th semiconductor chip 440, the p-th semiconductor chip 450, and the q-th semiconductor chip 460) can be "follower" chiplets. The "leader" chiplet may generate a global clock, and may transmit the global clock to the "follower" chiplets via the redistribution structure 130. A CoWoS interposer may have 12 ps propagation delay per 2 mm channel trace length. A "leader" chip may be assigned properly (e.g., Chiplet_n) to make clock propagation delay that can be ignored.

FIGS. 5A and 5B collectively illustrate a schematic diagram of an example clock aligning/synchronizing circuit 500, in accordance with some embodiments. The clock aligning circuit 500 can be used for any type of die-to-die (e.g., 2.5D/3D IC). The clock aligning circuit 500A, 500B may include a first semiconductor chip 510A, 510B, a second semiconductor chip 520A, 520B, a m-th semiconductor chip 530A, 530B, a n-th semiconductor chip 540A, 540B, a p-th semiconductor chip 550A, 550B, a q-th semiconductor chip 560A, 560B, a x-th semiconductor chip 570A, 570B, a y-th semiconductor chip 580A, 580B, and a redistribution structure 130. Common features with those of FIG. 1 will not be described again for the sake of conciseness. In Phase I, the first semiconductor chip (e.g., chiplet_1) 510A can be a "leader" chiplet, and other semiconductor chips can be "follower" chiplets. The "leader" chiplet may generate a global clock 512, and may transmit the global clock to the "follower" chiplets via the redistribution structure 130. The global clock can be TO. If there are many chiplets, a leader chiplet can be chosen/selected to minimize a TO transmission distance/time. In Phase II, the m-th semiconductor chip (e.g., chiplet_m) 530B can be a new "leader" chiplet, and other semiconductor chips can be "follower" chiplets. The m-th semiconductor chip 530B may transmit another global clock 532. The m-th semiconductor chip 530B may act as a relay or an intermediate leader.

In some embodiments, the first semiconductor chip (e.g., Chiplet_1) 510B to the m-th semiconductor chip (e.g., Chiplet_m) 530B can be belonged to a global clock T0 domain. In the global clock T0 domain, the clock propagation delay can be ignored between Chiplet_1 to Chiplet_n. The m-th semiconductor chip (e.g., Chiplet_m) 530B to the y-th semiconductor chip (e.g., Chiplet_y) can be belonged to a virtual global clock T0 domain. In the virtual global clock T0 domain, the clock propagation delay can be ignored between Chiplet_m to Chiplet_y. In such case, the Chiplet_m and the Chiplet_n can be belonged to both global clock T0 and virtual global clock T0 domains. Data can be transferring from the global clock T0 domain to the virtual global clock T0 domain via Chiplet_m or Chiplet_n such that the CLK propagation delay can be ignored.

If data is transferring from Chiplet_2 to Chiplet_y, following two steps can be included. Step I: data is transferring from Chiplet_2 to Chiplet_m or Chiplet_n (ignore CLK propagation delay). Step II: the data is transferring from Chiplet_m or Chiplet_n to Chiplet_y (ignore CLK propagation delay).

Figure 6:
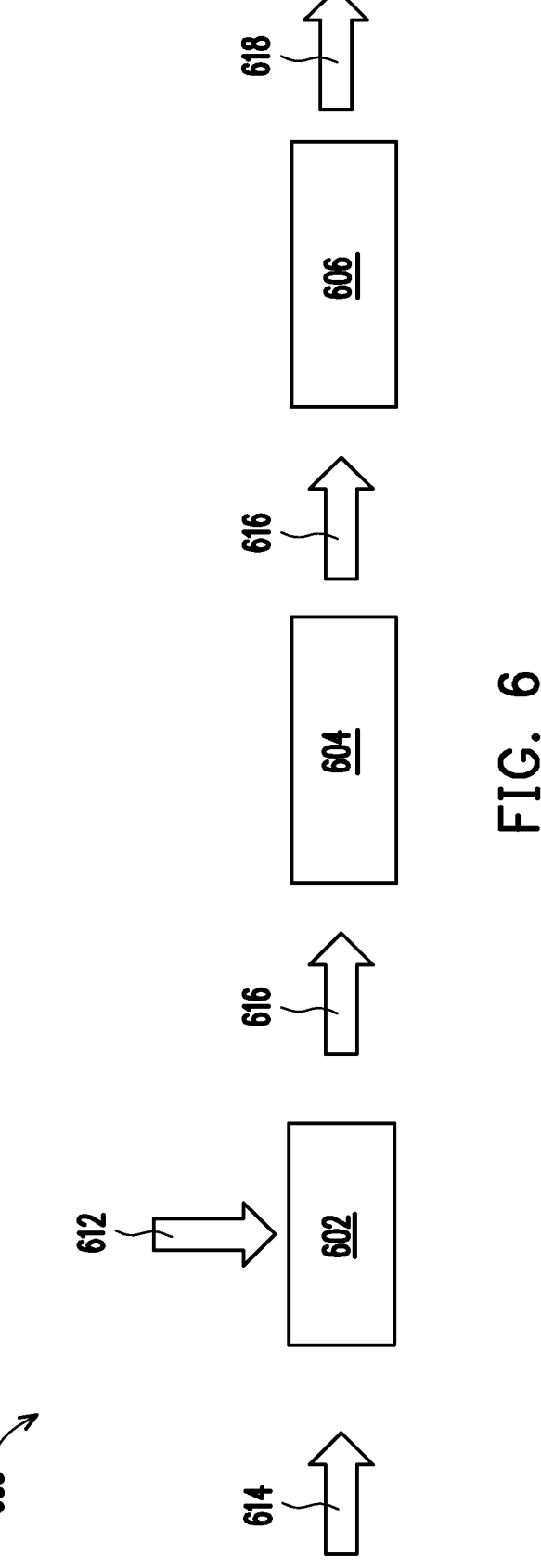
FIG. 6 is an example flow chart of a method for transmitting optical clock, in accordance with some embodiments.

FIG. 6 is an example flow chart 600 of a method for transmitting optical clock, in accordance with some embodiments. An optical modulator 602 may receive an electrical drive clock signal 612 and may manipulate properties (e.g., optical power or phase) of an optical signal 614 (e.g., a laser light source) according to the electrical drive clock signal 612. The optical modulator 602 may translate an electrical drive clock signal (e.g., a global clock) 612 to an optical global clock 616. The electrical drive clock signal 612 may be transmitted to the optical modulator 602 through a metal via. The optical modulator 602 may generate an optical clock signal 616. The optical clock signal 616 may be transmitted to an optical coupling waveguide 604 (e.g., intermediate waveguides). The optical clock signal 616 may communicate between different semiconductor chips through the optical coupling waveguide 604. The optical coupling waveguide 604 may include a number of optical waveguides to receive the optical clock signal 616. The optical coupling waveguide 604 can be an implementation of a global clock and data transmitting region. The optical coupling waveguide 604 can be employed in a clock aligning circuit to communicate a global clock signal.

A photo detector 606 may detect the optical clock signal 616 and may convert the optical clock signal 616 back to an output electrical clock signal 618. The output electrical clock signal 618 may be transmitted to a metal contact through a metal via. The metal via may extend through a plurality of insulator layers and electrically couple to a semiconductor chip (e.g., a chiplet).

An optical global clock may propagate on silicon or silicon nitride waveguide, which may have group delay (Vg). Vg can equal to C/ng. The ng can be a group index (e.g., an average refractive index) associated with the transmitting medium (e.g., silicon or silicon nitride). A time delay can be L/Vg. According to refractive index (ng) of silicon and silicon nitride (ng$_{Si}$=4, ng$_{SiN}$=1.91), a time delay can be about 0.27 and 0.13 ps/2 mm for silicon and silicon nitride waveguides, respectively.

Figure 7:
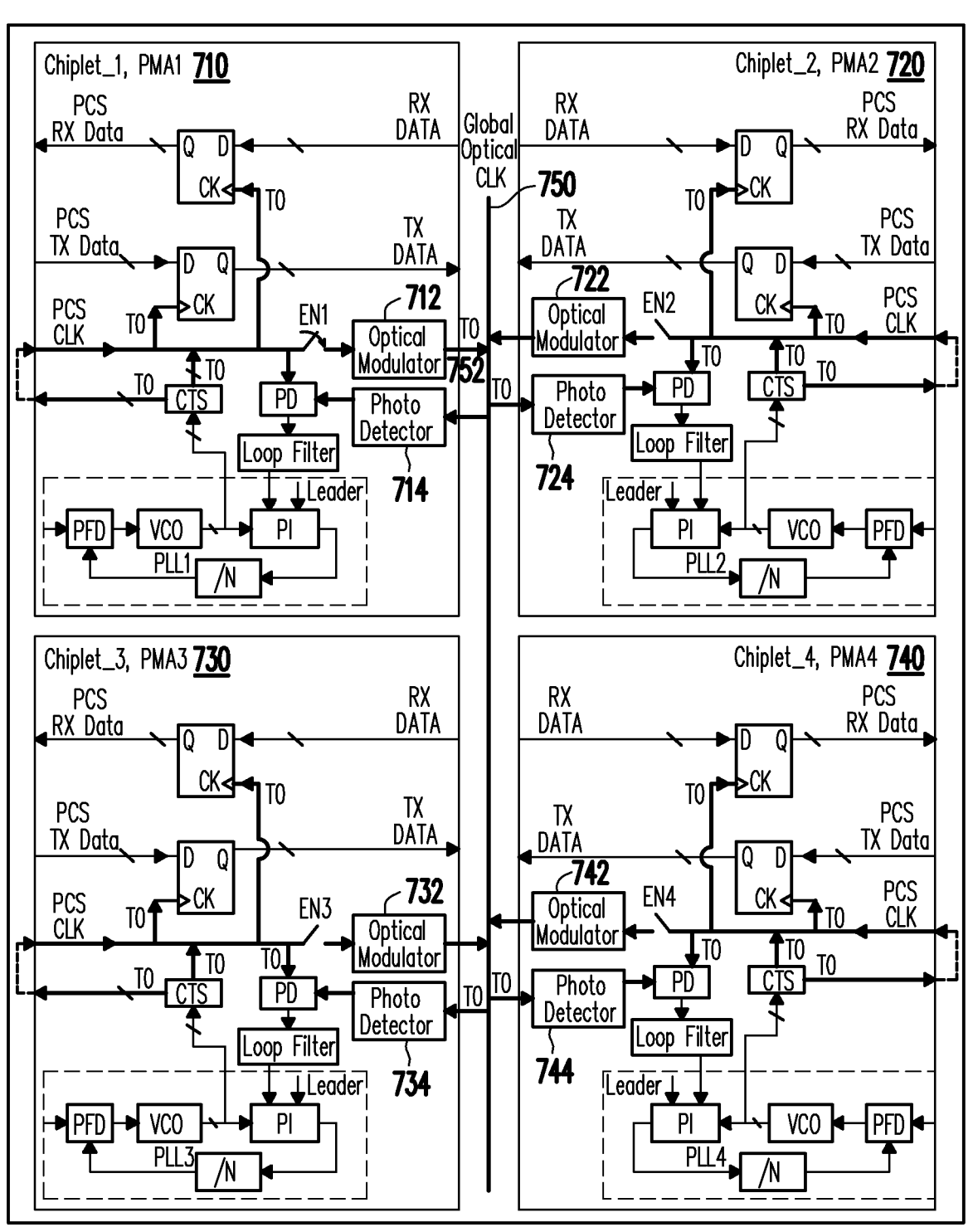
FIG. 7 is a schematic diagram of an example clock aligning circuit with an optical global clock, in accordance with some embodiments.

FIG. 7 is a schematic diagram of an example clock aligning/synchronizing circuit 700 with an optical global clock, in accordance with some embodiments. The clock aligning circuit 700 can be used for any type of die-to-die (e.g., 2.5D/3D IC). The clock aligning circuit 700 may include a first semiconductor chip 710, a second semiconductor chip 720, a third semiconductor chip 730, a fourth semiconductor chip 740, a redistribution structure 750 (130), a first optical modulator 712, a second optical modulator 722, a third optical modulator 732, a fourth optical modulator 742, a first photo detector 714, a second photo detector 724, a third photo detector 734, and a fourth photo detector 744. Common features with those of FIG. 1 will not be described again for the sake of conciseness. Each semiconductor may further include an optical modulator and a photo detector. The first semiconductor chip 710 can be a "leader" chiplet, and other semiconductor chips can be "follower" chiplets. The "leader" chiplet may generate a global clock, and may transmit the global clock to the "follower" chiplets via the redistribution structure 750.

The redistribution structure 750 can be configured to optically couple the plurality of semiconductor chips to each other. The redistribution structure 750 can be further configured to transmit a single global optical clock signal 132 (e.g., TO). The single global clock can be driven from the "leader" chiplet with phase of TO. The redistribution structure 750 can be formed over an interposer (e.g., a CoWoS interposer). The redistribution structure 750 may comprise optically coupling features such as optical fibers or optical waveguides, and may comprise electrically conductive features such as one or more layers of conductive lines and vias formed in one or more dielectric layers. For simplicity, the optically coupling features, electrically conductive features, and the dielectric layers of the redistribution structure 750 are not illustrated individually in FIG. 7.

In a "leader" chiplet, in order to transmit a global clock signal, the optical modulator 712 of the "leader" chiplet may receive an electrical drive clock signal. The optical modulator may manipulate properties (e.g., optical power or phase) of an optical signal (e.g., a laser light source) according to the electrical drive clock signal. The optical modulator 712 may translate an electrical drive clock signal (e.g., a global clock) to an optical global clock. The optical modulator 714 may generate an optical clock signal 752. In some embodiments, the "leader" chiplet can also be any of the follower chiplets. The optical modulator of the "leader" chiplet may generate a single global optical clock signal.

The photo detector 714, 724, 734, 744 may detect the global optical clock signal 752 and convert the global optical clock signal 752 back to an output electrical clock signal. The output electrical clock signal may be transmitted to the corresponding semiconductor chip. For a clock aligning/synchronizing circuit 700 with an optical global clock, an optical clock may have almost no time delay in communication.

Figure 8:
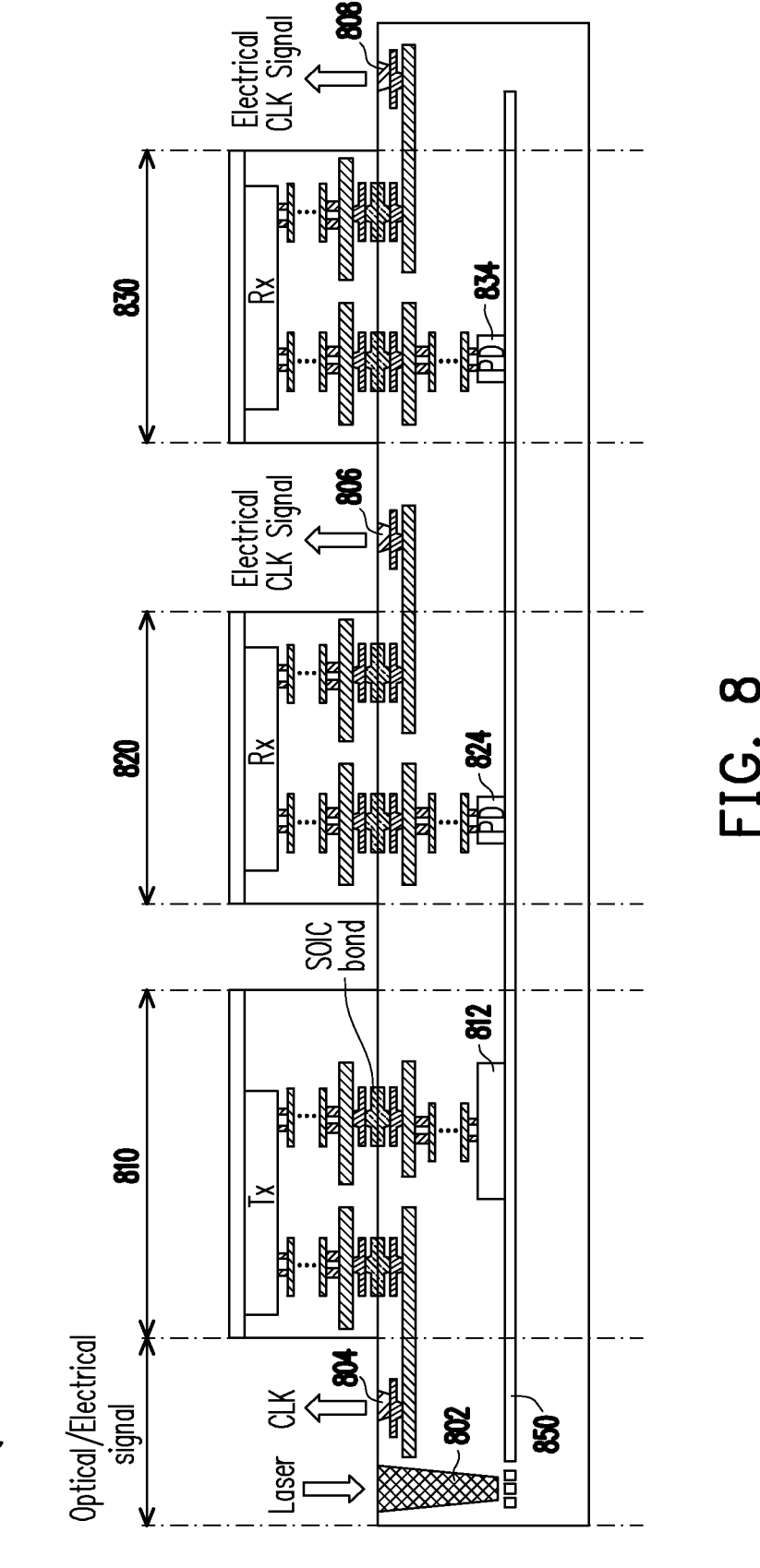
FIG. 8 illustrates a cross-sectional view of a portion of the example clock aligning circuit of FIG. 7, in accordance with some embodiments.

FIG. 8 illustrates a cross-sectional view of a portion of the clock aligning/synchronizing circuit 800 of FIG. 7, in accordance with some embodiments. For example, the clock aligning/synchronizing circuit 800 may include a first semiconductor chip 810, a second semiconductor chip 820, a third semiconductor chip 830, a grating coupler 802, a first metal contact 804, a second metal contact 806, a third metal contact 808, a modulator 812, an optical coupling waveguide (e.g., a redistribution structure) 850, a first photo detector 824, and a second photo detector 834. The clock aligning circuit 800 can be used for any type of die-to-die (e.g., 2.5D/3D IC). In some embodiments, the clock aligning circuit 800 can be fabricated on a silicon on insulator (SOI) layer. The SOI layer may be used for active devices (e.g., modulators, monitors, or photodetectors). The cross-sectional view of the clock aligning circuit 800, in FIG. 8, is simplified as a schematic diagram. Further, it should be appreciated that over the SOI layer, the clock aligning circuit 800 can include any of various other optical receivers/transmitters attached thereto, for example, one or more modulators, one or more photodetectors, etc., while remaining within the scope of present disclosure. In some embodiments, an interconnect structure (not shown) can be formed over the optical/photonic device features for electrical connection.

In some embodiments, the first metal contact 804 may receive an electrical clock signal from an electrical die. The electrical clock signal may be transmitted to the modulator 812 through a metal via. The metal via may extend through a plurality of insulator layers and electrically couple to the modulator 812.

The modulator 812 may receive the electrical clock signal, and may manipulate properties (e.g., optical power or phase) of an optical signal (e.g., a laser light source) according to the electrical clock signal. The modulator 812 may generate a global optical clock signal and may transmit the global optical clock to the optical coupling waveguide 850. The global optical clock signal may be transmitted to an optical coupling waveguide (e.g., intermediate waveguides). An optical signal may be coupled in between an optical fiber and a grating coupler through the modulator.

The first and/or second photo detector 824, 834 may be employed to detect the global optical clock signal from the optical coupling waveguide 850, and may convert the global optical clock signal to an output electrical clock signal. The output electrical clock signal may be transmitted to the second metal contact 806 and the third metal contact 808 through a metal via. The metal via may extend through a plurality of insulator layers and electrically couple to the second and/or third metal contact 806, 808.

The grating coupler 802 can allow the waveguide to transmit light to or receive light from an overlying light source or optical signal source (e.g., through an optical fiber). The grating coupler 802 may be formed by acceptable photolithography and etching techniques. In some embodiments, the grating coupler 802 is formed after the waveguide is defined. For example, a photoresist may be formed and developed on a side of the overlaying semiconductor material (e.g., on the waveguide and in the recesses defining them). The grating coupler 802 may optically couple to the optical coupling waveguide 850.

The optical coupling waveguide 850 may transmit an optical clock signal. The optical coupling waveguide 850 shown in FIG. 8 is provided for illustration purposes, and thus, it should be appreciated that a clock aligning/synchronizing system, as disclosed herein, can include any number (e.g., from 1 to 1000) of the waveguides stacked in any of various other arrangements, while remaining within the scope of present disclosure. As shown, the waveguides are vertically stacked on top of one another. In some embodiments, the optical coupling waveguide 850 can be formed of SiN layers. The semiconductor chips can optically communicate with each other through the optical coupling waveguide.

In some embodiments, it should be appreciated that the clock aligning/synchronizing circuit 800 could each be a system-on-chip (SoC) or a system-on-integrated-circuit (SoIC) device/package. The clock aligning/synchronizing circuit 800 may use a system on integrated chip (SoIC) bond to connect optical and electrical dies. A laser may couple to Si waveguide by a grating coupler (GC). The electrical signal through the SoIC bond to drive a transmitter and an optical modulator. An optical clock signal can be generated by the optical modulator. The photo detector (PD) may detect the optical clock signal, and may translate the optical clock signal to an electrical clock.

FIG. 9 is an example flow chart of a method for clock aligning/synchronizing in chiplets, in accordance with some embodiments. In overview, the method 900 may include generating a global clock signal in a clock aligning/synchronizing circuit.

Referring to (902), and in some embodiments, a semiconductor package can be provided. The semiconductor package may include a plurality of semiconductor chips coupled to one another. The semiconductor package may include a redistribution structure with at least the first and second semiconductor chips bonded thereto. The semiconductor package may include a through-silicon/substrate via structure connecting the first semiconductor chip to the second semiconductor chip.

Referring to (904), and in some embodiments, a global clock signal can be generated by a first one of the plurality of semiconductor chips (e.g., a "leader" chip). The global clock signal can be transmitted through the redistribution structure. The global clock signal may be transmitted through the through-silicon/substrate via structure.

Referring to (906), and in some embodiments, the global clock signal can be received by a second one of the plurality of semiconductor chips (e.g., a "follower" chip).

Referring to (908), and in some embodiments, at least the first semiconductor chip and the second semiconductor chip may communicate data synchronized with the global clock signal.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor package, comprising:
a plurality of semiconductor chips; and
a redistribution structure configured to electrically couple the plurality of semiconductor chips to each other, and further configured to transmit a single global clock signal;
wherein data transferred across the plurality of semiconductor chips is synchronized in a clock domain to which the single global clock signal belongs, wherein the single global clock signal is transmitted through a bypass phase interpolator in a phase locked loop of a leader chiplet among the plurality of semiconductor chips,
wherein each of the plurality of semiconductor chips comprises a phase interpolator configured to align a phase of a respective local clock signal with a phase of the single global clock signal.

2. The semiconductor package of claim 1, wherein
a first one of the plurality of semiconductor chips is configured to provide the single global clock signal to the redistribution structure, while being configured to not receive a feedback signal responsive to the single global clock signal; and
a second one of the plurality of semiconductor chips is configured to receive the single global clock signal from the redistribution structure.

3. The semiconductor package of claim 1, wherein
a first one of the plurality of semiconductor chips is configured to provide the single global clock signal to the redistribution structure, while being coupled to the redistribution structure to receive a feedback signal responsive to the single global clock signal; and
a second one of the plurality of semiconductor chips is configured to receive the single global clock signal from the redistribution structure.

4. The semiconductor package of claim 1, wherein
a first one of the plurality of semiconductor chips is configured to provide the single global clock signal to the redistribution structure, while being coupled to the redistribution structure to receive a feedback signal responsive to the single global clock signal;
a second one of the plurality of semiconductor chips is configured to receive the single global clock signal from the redistribution structure; and
a third one of the plurality of semiconductor chips is configured to receive the single global clock signal from the redistribution structure.

5. The semiconductor package of claim 4, wherein the redistribution structure comprises a conductive interconnect structure physically extending across the first semiconductor chip, the second semiconductor chip, and the third semiconductor chip.

6. The semiconductor package of claim 5, wherein a first distance of a first portion of the conductive interconnect structure physically between the first and second semiconductor chips is approximately equal to a second distance of a second portion of the conductive interconnect structure physically between the first and third semiconductor chips.

7. The semiconductor package of claim 1, wherein, during a first operation phase, a first one of the plurality of semiconductor chips is configured to provide the single global clock signal to the redistribution structure, while being configured to not receive a feedback signal responsive to the single global clock signal; and a second one of the plurality of semiconductor chips is configured to receive the single global clock signal from the redistribution structure.

8. The semiconductor package of claim 7, wherein, during a subsequent operation phase, the second semiconductor chip is configured to provide the single global clock signal, while the first semiconductor chip is configured to receive the single global clock signal.

9. The semiconductor package of claim 1, wherein the redistribution structure comprises an optical waveguide physically extending across the plurality of semiconductor chips, the optical waveguide being configured to carry the single global clock signal.

10. A semiconductor package, comprising:

a first semiconductor chip configured to generate a global clock signal, wherein the first semiconductor chip comprises a bypass phase interpolator in a phase locked loop configured to transmit the global clock signal;

a second semiconductor chip, electrically coupled to the first semiconductor chip, that is configured to receive the global clock signal and align its local clock signal with the global clock signal, wherein the second semiconductor chip comprises a phase interpolator configured to align a phase of a local clock signal with a phase of the global clock signal;

wherein data transferred between the first semiconductor chip and the second semiconductor chip is synchronized with a clock domain of the global clock signal.

11. The semiconductor package of claim 10, further comprising a redistribution structure to which the first semiconductor chip and the second semiconductor chip are bonded, wherein the first semiconductor chip and the second semiconductor chip are arranged on the redistribution structure side-by-side.

12. The semiconductor package of claim 11, wherein the redistribution structure comprises a conductive interconnect structure physically extending across the first and second semiconductor chips, and configured to carry the global clock signal.

13. The semiconductor package of claim 11, wherein the redistribution structure comprises an optical waveguide physically extending across the first and second semiconductor chips, the optical waveguide being configured to carry the global clock signal.

14. The semiconductor package of claim 10, wherein the first semiconductor chip and the second semiconductor chip are vertically bonded to each other.

15. The semiconductor package of claim 14, wherein at least one of the first or second semiconductor chip includes a through-silicon/substrate via structure configured to carry the global clock signal.

16. The semiconductor package of claim 10, wherein, in a later operation phase, the second semiconductor chip is configured to generate the global clock signal, while the first semiconductor chip is configured to receive the global clock signal.

17. A method for operating semiconductor packages, comprising:

providing a semiconductor package including a plurality of semiconductor chips coupled to one another;

generating, by a first one of the plurality of semiconductor chips, a global clock signal, wherein generating the global clock signal comprises transmitting the global clock signal through a bypass phase interpolator in a phase locked loop of the first semiconductor chip;

receiving, by a second one of the plurality of semiconductor chips, the global clock signal; and communicating, between at least the first semiconductor chip and the second semiconductor chip, data synchronized with the global clock signal, wherein each of the plurality of semiconductor chips comprises a phase interpolator configured to align a phase of a respective local clock signal with a phase of the single global clock signal.

18. The method of claim 17, wherein the semiconductor package includes a redistribution structure with at least the first and second semiconductor chips bonded thereto, the method further comprises:

transmitting the global clock signal through the redistribution structure.

19. The method of claim 17, wherein the semiconductor package includes a through-silicon/substrate via structure connecting the first semiconductor chip to the second semiconductor chip, the method further comprises:

transmitting the global clock signal through the through-silicon/substrate via structure.

20. The method of claim 18, wherein the redistribution structure comprises an optical waveguide physically extending across the plurality of semiconductor chips, the optical waveguide being configured to carry the single global clock signal.

* * * * *